United States Patent
Lee et al.

[11] Patent Number: 5,582,201
[45] Date of Patent: Dec. 10, 1996

[54] GAS SAFETY SHUTOFF APPARATUS

[75] Inventors: Edward R. Lee, San Marcos; Christopher G. Turney, Manchaca, both of Tex.

[73] Assignee: S. H. Leggitt Company, San Marcos, Tex.

[21] Appl. No.: 336,533

[22] Filed: Nov. 9, 1994

[51] Int. Cl.⁶ .................................................. F16L 29/02
[52] U.S. Cl. .................... 137/454.2; 251/149.4; 251/149.6
[58] Field of Search ............... 137/454.2; 251/149.4, 251/149.6

[56] References Cited

U.S. PATENT DOCUMENTS

| | | | |
|---|---|---|---|
| 1,701,162 | 2/1929 | Norgrey | 137/454.2 |
| 2,173,295 | 9/1939 | Coles et al. | 137/454.2 |
| 2,756,075 | 7/1956 | Rayner, Jr. . | |
| 2,770,474 | 11/1956 | Krapp . | |
| 4,070,003 | 1/1978 | Shames et al. . | |
| 4,476,892 | 10/1984 | Boyce . | |
| 4,632,146 | 12/1986 | Looney . | |
| 4,638,975 | 1/1987 | Iuchi et al. . | |
| 4,911,194 | 3/1990 | Lechner . | |
| 5,330,155 | 7/1994 | Lechner . | |

*Primary Examiner*—John C. Fox
*Attorney, Agent, or Firm*—Price, Heneveld, Cooper, DeWitt & Litton

[57] ABSTRACT

An assembly which includes a valve adapted for connection to a source of pressurized gas having a first connector, a regulator for regulating flow of gas from the source and having a second connector, and an automatic shutoff module positioned in the first connector, the module being adapted to shut off the gas flow in response to certain unsafe conditions, e.g., excess ambient temperatures and/or excess gas flow rates. The second connector includes a probe which is receivable by the first connector, and further includes a connector element that is rotatably mounted on the second connector and adapted to engage the first connector to form a secure interconnection between the first and second connectors. The automatic shutoff module includes an activator housing and an activator movably mounted in the activator housing, the activator being normally closed but being abuttingly held open by the probe upon connection. A thermally sensitive member or element is provided that yields upon sensing temperature in excess of about 200 degrees F., thus allowing the module to automatically close, whereby the module shuts off the flow of gas.

18 Claims, 6 Drawing Sheets

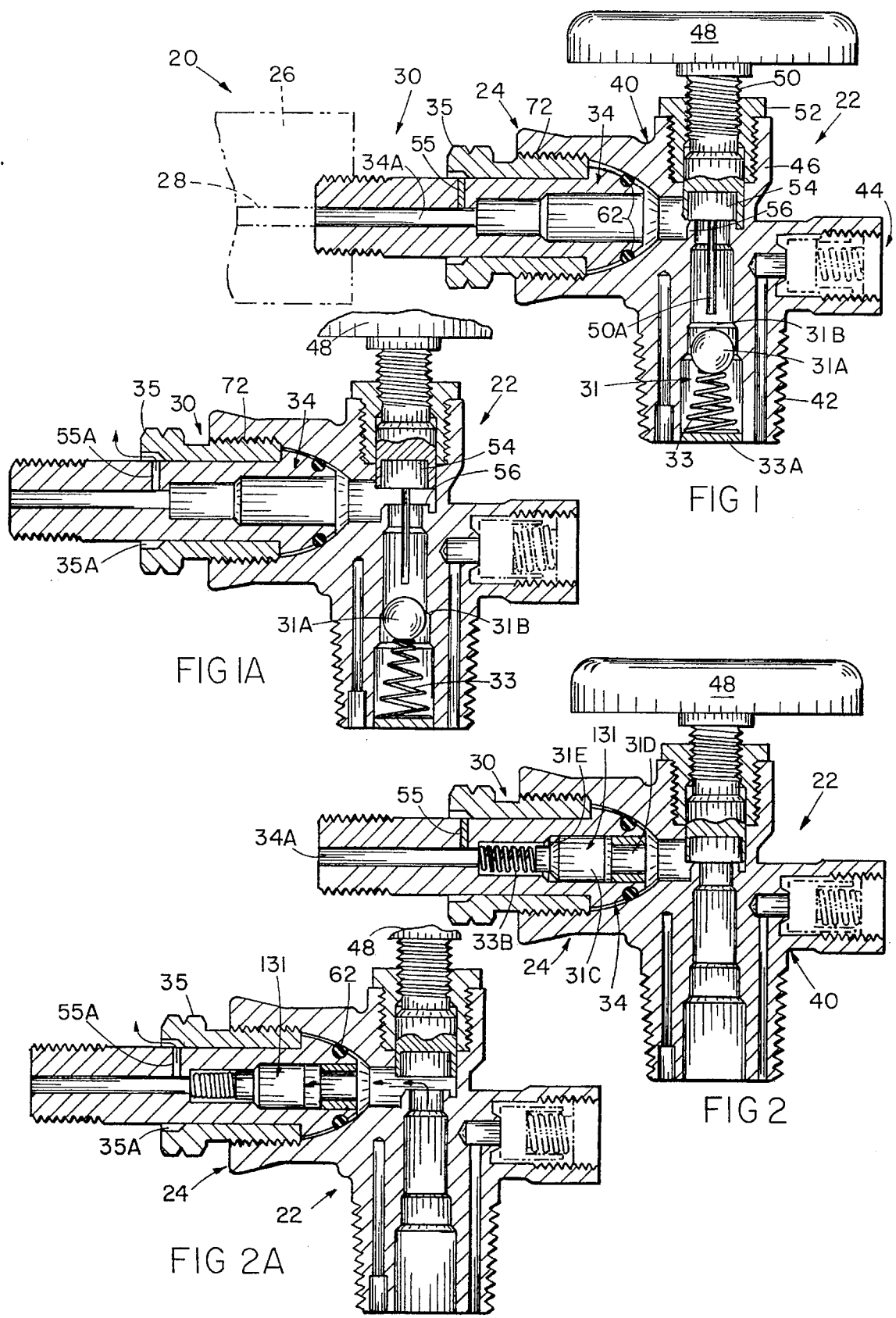

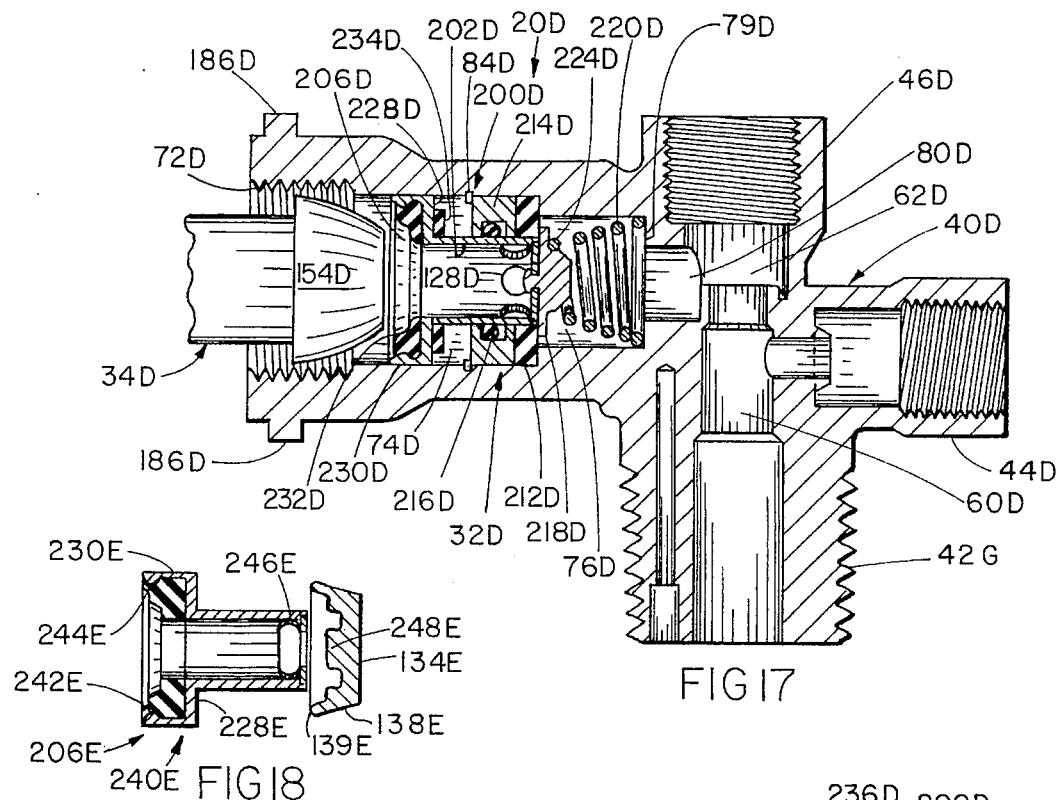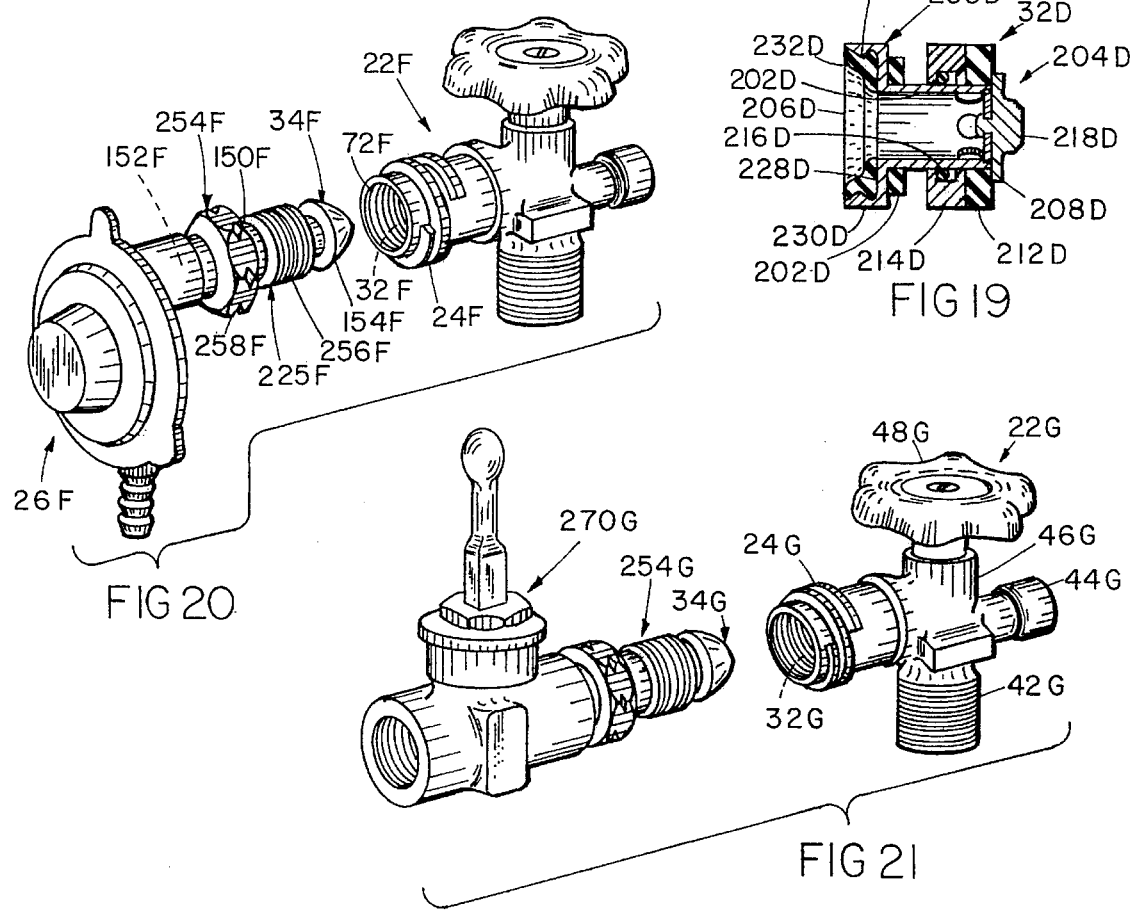

GAS SAFETY SHUTOFF APPARATUS

BACKGROUND OF THE INVENTION

The present invention relates to a gas safety shutoff apparatus, and in particular to a connection system adapted to close off fluid flow, or reduce it to a minimal amount, upon sensing excessive temperature and/or flow rate.

A number of different connection systems and connectors are known for connecting a source of pressurized gas such as LP gas or natural gas to a device using the gas such as an outdoor grill or stove. However, improvements are desired to permit quick and reliable interconnection/disconnection of the connectors without separate hand tools and without fear of improper connection, while also providing increased safety. Further, aside from the quick connection feature, it is desirable to provide a flow control safety feature that shuts off gas flow in the event of high temperature or that greatly reduces gas flow in the event of excessive gas flow. Still further, it is desirable for any such connection system to include replaceable seals, redundant sealing and/or positive sealing which engages before any flow of gas is permitted.

SUMMARY OF THE INVENTION

One aspect of the present invention is to provide an assembly for safe regulation of gas flow. The assembly includes a valve adapted for connection to a source of pressurized gas which includes a first connector defining a first passageway for communicating gas therethrough, and a regulator tot regulating the flow of gas from a source to a device adapted to use it, the regulator including a second connector adapted for connection to the first connector and defining a second passageway communicating with the first passageway when the valve and the regulator are interconnected. A thermally sensitive actuator is located at least partially in, or in communication with, one of the passageways, the thermally sensitive actuator enabling a shutoff member or apparatus to stop the flow of gas through the first and second passageways upon sensing excessive temperature. In one aspect of the invention, the shutoff apparatus includes a valve located in flow communication with one of the passageways, the valve being adapted to sealingly close the one passageway, and further includes a thermally sensitive member that deforms or yields upon application of excessive heat, thus allowing the valve to sealingly close.

In another aspect, an assembly for safe regulation of gas flow includes a valve adapted for connection to a source of pressurized gas including a first connector defining a first passageway for communicating gas therethrough, and a regulator for regulating the flow of gas from a source of pressurized gas to a device adapted to use the gas, the regulator including a second connector adapted for connection to the first connector, the second connector defining a second passageway communicating with the first passageway when the valve and the regulator are interconnected. The assembly further includes a module positioned in one of the passageways, the module being adapted to close the one passageway, and also includes means for automatically activating the module upon sensing an emergency condition, to close the passageway. In a narrower form the means for automatically activating the module may comprise a thermally sensitive member that yields to create an excess flow condition which activates a valve to close off the gas flow.

In another aspect, the invention includes a connection system which includes a first housing having an outlet defining a passageway, a module insertable into the passageway, and means for retaining the module in the passageway. The module includes an activator and an activator housing operably receiving the activator, the activator being biased toward a closed position but being movable to an open position for allowing fluid flow through the passageway. The connection system further includes a probe insertable into the first housing passageway, the probe including an end sealingly engaging the activator and biasing the activator to the open position. Holding means is provided for holding the probe in the first housing passageway against the activator, the holding means including a thermally sensitive member that deforms upon sensing excessive temperature and thus allows the activator to move to the closed position.

An object of the present invention is to provide a connection system that automatically closes off and stops fluid flow upon sensing excessive temperature, to thus reduce the risk of fire. Further, it is an object of the present invention to provide redundant valving and redundant sealing to provide a more secure system. Another object is to provide replaceable seals in such a system. Another object is to provide automatic control means for controlling fluid flow, which automatically reacts to excessive flow. Another object is to provide a connection system in which there is no flow of gas until a positive seal is achieved.

These and other features, advantages and objects of the present invention will be further understood and appreciated by those skilled in the art by reference to the following specification, claims and appended drawings.

BRIEF DESCRIPTION OF THE DRAWINGS

FIG. 1 and 1A are fragmentary side cross-sectional views of a valve and gas regulator embodying a first form of the present invention, shown in two different conditions;

FIG. 2 and 2A are fragmentary side cross-sectional views of apparatus similar to that illustrated in FIGS. 1 and 1A, but showing a second embodiment thereof in two different conditions of operation;

FIG. 17 is a side cross-sectional view showing a connection system including a modified insert module embodying the present invention;

FIG. 18 is a side cross-sectional view of a modified activator embodying the present invention;

FIG. 19 is an enlarged cross-sectional view of the activator shown in FIG. 17;

FIG. 20 is an exploded perspective view showing another modification embodying a valve and modified regulator adapted for interconnection but without using a thermally sensitive nut; and FIG. 21 illustrates a valve including the module interconnected to a standard toggle-actuated hose end valve embodying the present invention.

DETAILED DESCRIPTION OF THE PREFERRED EMBODIMENT

Figure 3:
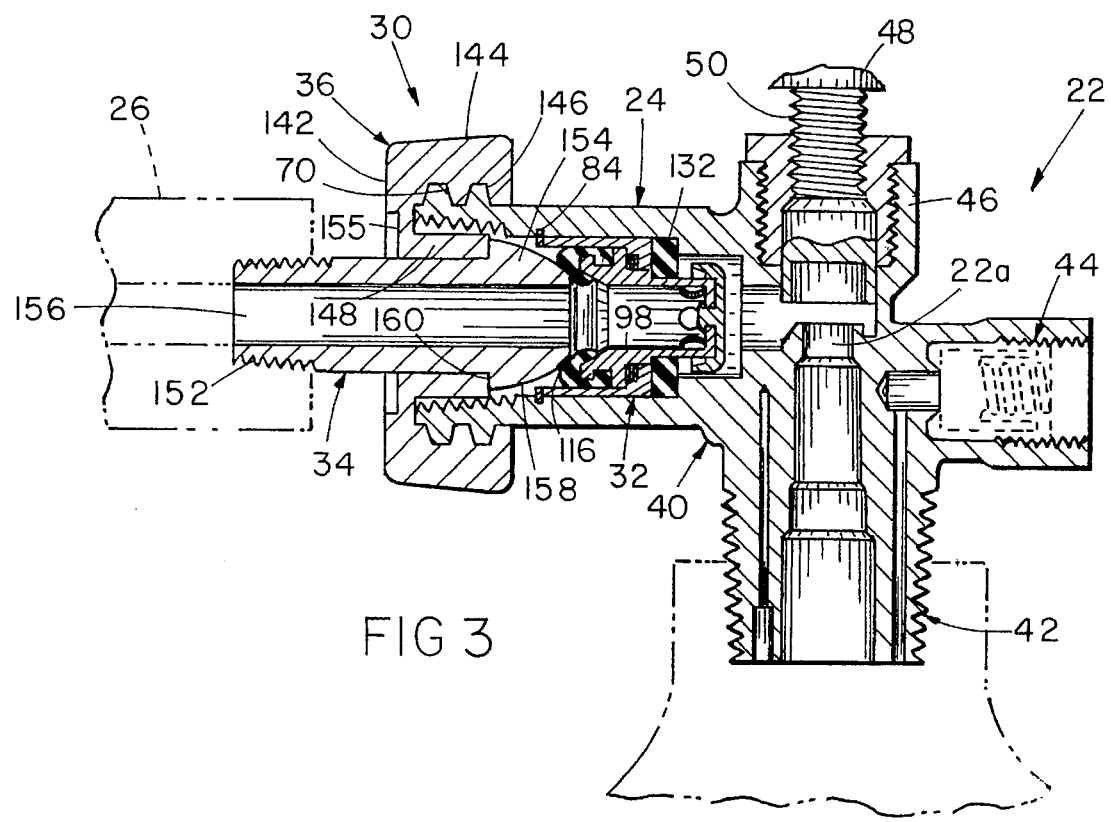
FIG. 3 is a fragmentary side cross-sectional view of apparatus similar to that shown in the preceding figures but embodying a thereof form of the invention.

An assembly 20 (FIGS. 1–3 inclusive) embodying differing but related forms of the present invention includes a manual control (on-off) valve 22 including an outlet 24, and a connection system 30 coupling valve outlet 24 to a gas-consuming appliance, most typically via a gas regulator 26 of a known nature (not specifically illustrated) having an inlet 28. Connector system 30 includes a safety shutoff valve 31 or valve module 32 located in manual valve 22, preferably outlet 24, and further includes a probe 34 extending from or otherwise coupled to regulator inlet 28, probe 34 being adapted to engage module 32 to open its internal valving (described hereinafter) to permit gas low through module 32. It may be recognized that probe 34, in a preferred embodiment, comprises in essence a basically standard "POL" fitting such as is conventionally mounted at the ends of a short length of copper tubing and used with a copper or brass hex nut 35 (FIGS. 1, 1A) to connect LP gas bottles to a regulator located a short distance away. In this case, however, the regulator is close to the valve and their connection is essentially direct; further, a hand tightenable nut or fastener 36 (FIGS. 3 and 4) is preferably used to securely interconnect valve outlet 24 to regulator inlet 28 by pressing probe 34 inside outlet 24. It should be noted that probe 34 or nut 36 includes a thermally sensitive portion 55, 155 which is adapted to yield at about 200 degrees F. so as to provide for automatic closing of valve 31 or module 32 to stop the flow of gas therethrough (as explained hereinafter) in the presence of excessively high ambient temperature.

Manual shutoff valve 22 includes a housing 40 having an externally threaded inlet 42 adapted for connection to a bottle of LP gas or similar natural gas (not shown) in a known manner, and also includes the aforementioned outlet 24, a pressure-relief valve 44, and an upwardly extending manual valve portion 46 aligned with inlet 42. A handle 48 is attached to a shaft 50 that extends through a bushing 52 threaded into the top of housing portion 46. Handle 48 can be rotated to raise and lower a shutoff valve seal or element 54, carried at the bottom of shaft 50, into and out of contact with a valve seat 56 to open or close a passage therethrough check valve 56, whereby gas is allowed to pass from valve inlet 42 through outlet 24 and probe 34. As will be recognized, valve 22 is generally of a known nature, but has certain features which depart from conventional such devices, as described hereinafter.

In the embodiment of the apparatus as shown in FIGS. 1, 1A, the safety shutoff valve 31 comprises a ball valve 31A disposed within the internal flow passage of manual valve inlet 42. Ball valve 31A is preferably a light-weight resilient sphere of a suitable polymeric material (e.g., Neoprene, Nitrile rubber, etc.), which normally rests in place atop a coil spring 33 retained in position by a snap ring 33A or the like. In its normal position, illustrated in FIG. 1, ball valve 31A is disposed a short distance beneath a corresponding conical seat 31B, with sufficient clearance on all sides to permit the ready flow of gas upward through inlet 42. In the presence of an excess gas flow, however, as would result from such things as downstream hose rupture, catastrophic regulator failure, etc., or from detected excess temperature, ball 31A is immediately forced upward and against seat 31B by the excess gas flow acting on the lower extremity of the ball, whereupon inlet 42 becomes blocked and sealed, and no further excess flow of gas can occur. Under these conditions, the connector system 30 may be disassembled by removal of nut 35 and probe 34 without any further escape of gas. Since the lower half of ball 31 remains exposed to high pressure from the gas source, it remains firmly in contact with seat 31B until either the pressure differential is removed or valve 22 is manually closed and ball 31A pushed downwardly off its seat. In the embodiment illustrated, this is automatically accomplished by rotation of handle 48 so as to bring shutoff valve portion 54 into contact with seat 56, since shaft 50 carries a downwardly-projecting extension 50A which is sized and positioned to make contact with the top of ball 31A and push it downwardly just prior to valve 54 contacting seat 56 to close the gas flow passage, whereupon ball 51A drops back down onto the top of spring 33 to restore equilibrium to the system.

The excess temperature-sensing means employed in the embodiments of FIGS. 1 and 2 comprises a fusible plug 55 which normally fills a lateral passage 55A extending through one side of probe 34 outwardly of or directly adjacent the rearward edge of the connector nut 35 (FIGS. 1, 1A, 2, 2A). Fusible plug 55 comprises a eutectic metal alloy or the like formulated to yield at the desired temperature, i.e., 200 degrees F. by in effect melting to the point where the gas pressure inside probe 34 will blow the melted material out the side of the probe. In order to guard against any inadvertent contact with persons or property upon such an incident, nut 35 may be undercut as shown at 35A to provide an overhanging shoulder that will direct the melted material toward the regulator 26 rather than letting it blow radially outward. Of course, the cross-sectional area of passage 55A should be large enough to allow for sufficient gas flow to provide for closure of valve 31, even though it controls the total amount of gas so emitted.

In the embodiment shown in FIGS. 2 and 2A the safety shutoff valve 121C generally an alogous valve 31 of FIGS. 1 and 1A is implemented by using a laterally shiftable piston-type check valve 31C which disposed directly in the flow passage of probe 34, where it is held in place by an angular or tubular retainer 31D. A biasing spring 33B normally forces valve 31C toward the right as shown in the drawings, so as to keep it spaced away from a corresponding conical seat 31E, thereby permitting gas flow around and along the outside of valve 31C and through the seat area 31E, from which the gas passes outwardly of probe 34 through its axial passage 34A. Upon the occurrence of any excess flow condition as described above, however, the excess flow immediately overcomes the spring force of spring 33B and carries valve 31C leftward into contact with seat 31E, thereby shutting off the flow of gas and avoiding any catastrophic results. Of course, under these conditions the manual valve 22 is still in an open condition, and must be closed by rotation of handle 48 before probe 34 is removed from valve outlet 24.

FIG. 3 shows a further embodiment of the invention, in which the same basic type of manual valve 22 is coupled to a probe 34 of the same or directly similar character as that discussed above, but in which a different form of automatic safety shutoff valve 32 (e.g., valve insert module is utilized instead of those designated 31 and 31A and discussed above. While the embodiment of FIG. 3 utilizes essentially the same type of probe 34 as that shown in the preceding figures and discussed above, it utilizes a different, externally threaded probe attachment device 36 which may incorporate an integral temperature-responsive portion, as discussed more fully below.

As discussed above in relation to the embodiments of FIGS. 1, 1A, 2 and 2A the outlet 24 of valve 22 has internal threads 72 for engagement by the external threads on attachment fitting 35, and these internal threads may be retained in the embodiment of FIG. 3 even though the generally cylindrical outer surface 66 of outlet 24 incorporates external threads 70 (e.g. Acme threads) in this embodiment. While the internal threads 72 of the FIG. 3 embodiment will permit use of valve 22 with conventional types of connectors such as 35, these threads also may be used to secure the valve insert module 32 inside outlet 24 in certain embodiments. In the embodiment of FIG. 3, however, this is accomplished by an internal snap ring, as noted below.

Figure 4:
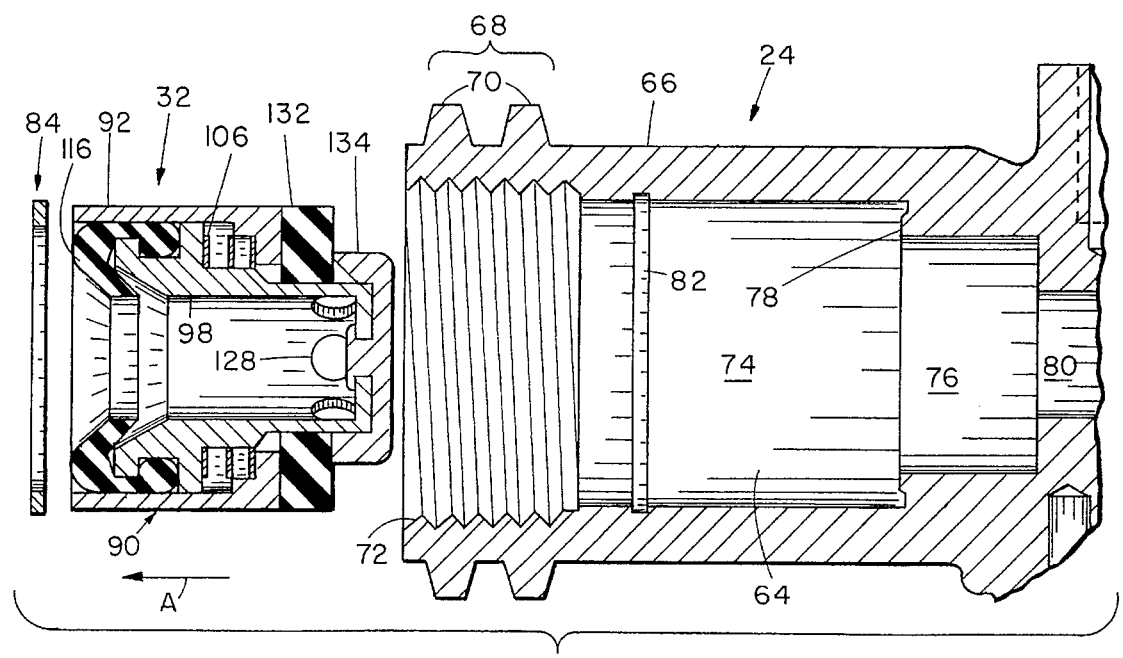
FIG. 4 is an enlarged exploded fragmentary view of the valve outlet and insert module shown in FIG. 3.
Figure 5:
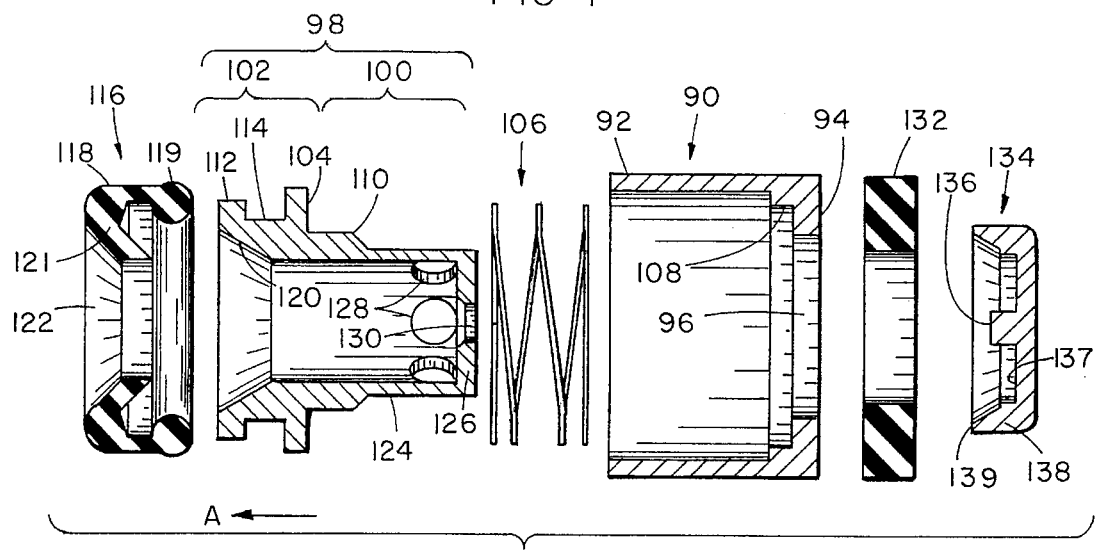
FIG. 5 is an exploded cross-sectional view of the insert module of FIGS. 3 and 4.
Figure 6:
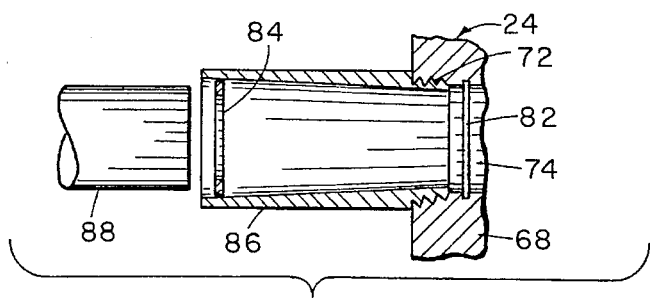
FIG. 6 is a schematic view illustrating installation of a snap ring for retaining the insert module in the valve outlet.

As best seen in FIG. 4, the outlet 24 of valve 22 (which is more elongated in the embodiments of FIG. 3), includes a passageway 64 having a first bore 74 disposed inwardly adjacent the threads 72, a second bore 76 with a seat 78 defined at its juncture with first bore 74, and a third bore 80 extending from second bore 76 into the primary gas flow to passageway 22A of valve 22, controlled by manual valve 54 and seat 56. A groove 82 is formed radially in first bore 74 proximate threads 72. Module 32 (FIGS. 4 and 5) is adapted to mateably slip fit into first bore 74 against seat 78, and a snap ring 84 resiliently seats in groove 82 to retain module 32 in place. Snap ring 84 can be inserted in a number of different ways such as by use of an insertion tool 86 (FIG. 6) having a tapered bore and a plunger 88 adapted to extend into insertion tool 86 so that snap ring 84 is radially compressed as it is guided past threads 72 and then seated in groove 82. Use of snap ring 84 permits replacement of module 32 and or its seals.

Module 32 is a multi-piece assembly adapted to be slip-fit into first bore 74 as a single unit. Module 32 includes a housing 90 with a cylindrically shaped wall or flange 92 and an inwardly extending flange 94 (FIG. 5) at one end that defines a hole 96. A piston-type check activator 98 is positioned in housing 90. Activator 98 is configured to operably telescopingly slide within housing 90 and includes a first cylindrically-shaped wall section 100 that extends through hole 96, and a second wall section 102 connected to first wall section 100. Second wall section 102 includes an outwardly oriented flange 104 located at the juncture of first and second wall sections 100 and 102. A coil spring 106 is located between activator flange 104 and housing flange 94. Step 108 in housing wall 92 adjacent flange 94, and step 110 in wall section 100 reduce the drag of coil spring 106 on activator 98 as spring 106 is compressed and extended.

A second outwardly extending flange 112 is positioned on activator second wall section 102 spaced from first outwardly extending flange 104. A depression 114 is thus defined between flanges 104 and 112. A ring shaped seal 116 includes an outer ring portion 118 having an 0-ring-like edge 119 adapted to seat into depression 114. Outer ring portion 119 is adapted to sealingly engage housing wall 92 and prevent leakage of gas between housing wall 92 and activator 98. Ring shaped seal 116 further includes a lipped portion 121 that extends from outer ring portion 118 around wall second flange 112 and partially into the inclined inlet surfaces 120 on the open end of activator wall section 102. The inlet surfaces 122 on ring shaped seal 116 are inclined to provide better sealing engagement with probe 34, as noted below, which therefore need not include the 0-ring 62 of the FIGS. 1 and 2 embodiments.

First wall section 100 (FIG. 5) of activator 98 includes a reduced diameter end portion 124 and an inwardly oriented end flange 126. Multiple holes 128 extend radially through reduced diameter end portion 124 proximate end flange 126, and a centered hole 130 is located in end flange 126. When assembled, an elastomeric washer-like seal 132 is positioned on reduced diameter end portion 124 of activator 98 in a position exposing or uncovering holes 128. A cup-shaped seat 134 is attached to end flange 126 by means of a centered protrusion 136 that extends through centered hole 130 and is pinned or rivetted over inside end flange 126 to securely attach seat 134 thereto. Cup-shaped seat 134 includes an umbrella-shaped perimeter 138. A depression 137 defined between perimeter 138 and protrusion 136 receives end flange 126. The extreme end of perimeter 138 forms a lip 139 for sealingly engaging seal 132.

Figure 7:
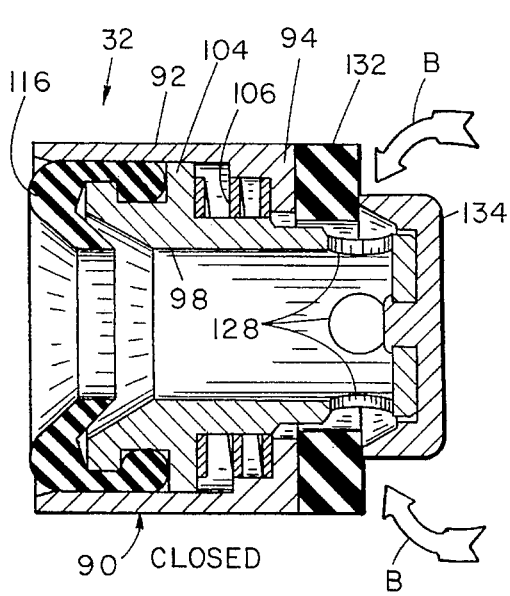
FIG. 7 is a cross-sectional view showing the insert module in the closed position.
Figure 8:
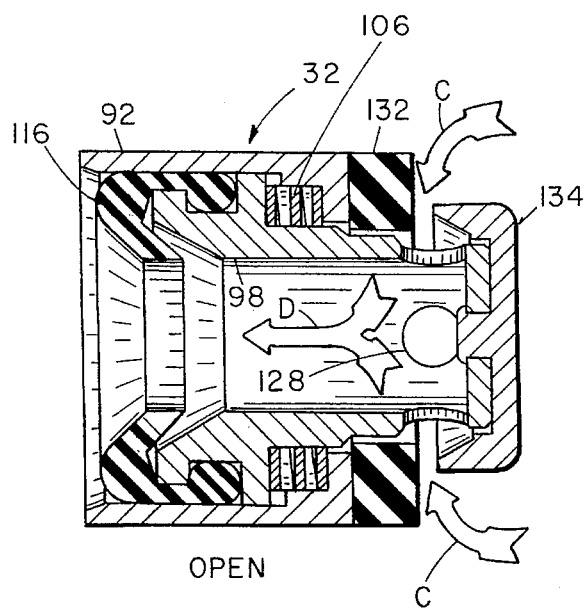
FIG. 8 is a cross-sectional view showing the insert module in the open position.

When assembled together and in a free state (FIG. 7) activator 98 is located within housing 90 with spring 106 located between housing flange 94 and activator flange 104. Ring-shaped seal end 116 sealingly engages the inside of housing wall 92 and prevents leakage between housing 90 and activator 98. Spring 106 biases activator 98 in direction A (FIGS. 4 and 5) so that cup-shaped seat 134 engages washer 132 which, in turn, seals against the end flange 94 of housing 90. Thus, holes 128 in the end of activator 98 are closed off, and gas is not permitted to flow through activator 98, as illustrated by arrows B (FIG. 7). However, when activator 98 is pushed inwardly by insertion of probe 34 against the force of spring 106, and spring 106 is thereby compressed, cup-shaped seat 134 is moved away from the end of housing 90 and holes 128 are exposed. Thus, gas is allowed to flow through holes 128 and through the open center of activator 90, as shown by arrows C and D (FIG. 8).

Nut 36 (FIG. 3) includes an outer section 142 having a ribbed outer surface 144 to facilitate grasping. Nut 36 further includes large, readily-engaged relatively coarse (e.g., Acme) threads 146 defined on an inner surface of outer section 142 for engaging corresponding coarse threads 70 on valve outlet 24. Nut 36 also includes a projecting cylindrical or annular shoulder on the rear side of inner section 148 for engaging probe 34, and a thermally yieldable portion or section 155 of predetermined thickness interconnecting outer section 142 and inner section 148, as discussed below. Thermally yieldable section 155 is configured to soften, deform and give way as the ambient temperature reaches or exceeds about 200 degrees F. as was also true of the fusible relief plug 55 discussed above.

Probe 34 (FIG. 3) is a tubular member having a threaded end 152 for engaging a female threaded connector on regulator 26 and further having a particularly configured forward end 154. A passage 156 is formed longitudinally through probe 34. Configured end 154 is enlarged and includes an acruately tapered outer surface 158 at its front extremity, with a reversed annular shoulder 160 spaced from but proximate the forward-most end of probe 34. The terminal end of cylindrical inner section 148 of nut 36 is adapted to engage probe shoulder 160 and center probe configured end 154 in valve outlet 24 as nut 36 is tightened. Nut 36 initially carries probe 34 into engagement with activator 98 so that probe tapered surface 158 sealingly engages ring-shaped seal 116 on activator 98. This substantially prevents any loss or leakage of gas during interconnection, even if valve 22 is partially open. As nut 36 is further tightened, activator 98 is forced forward to compress spring 106 and unseat cup-shaped seal 134. This exposes holes 128, allowing gas to flow through activator 98 as illustrated by arrows C and D (FIG. 8).

Several modifications of the above embodiments are contemplated and certain of these are illustrated in the other figures. These modifications are generally designated by using identical numbers for similar parts and features but with the addition of the letter A, B, C, etc. to designate the modified part. This is intended to reduce redundant discussion in the following descriptions.

Figure 9:
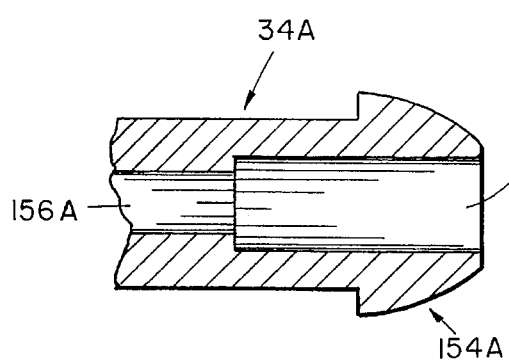
FIG. 9 is a side cross-sectional fragmentary view showing a preferred form of inlet member or probe for use in the present invention.
Figure 10:
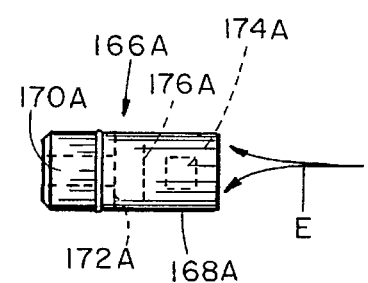
FIG. 10 is a side view of an excess flow controller for use in the invention.
Figure 12:
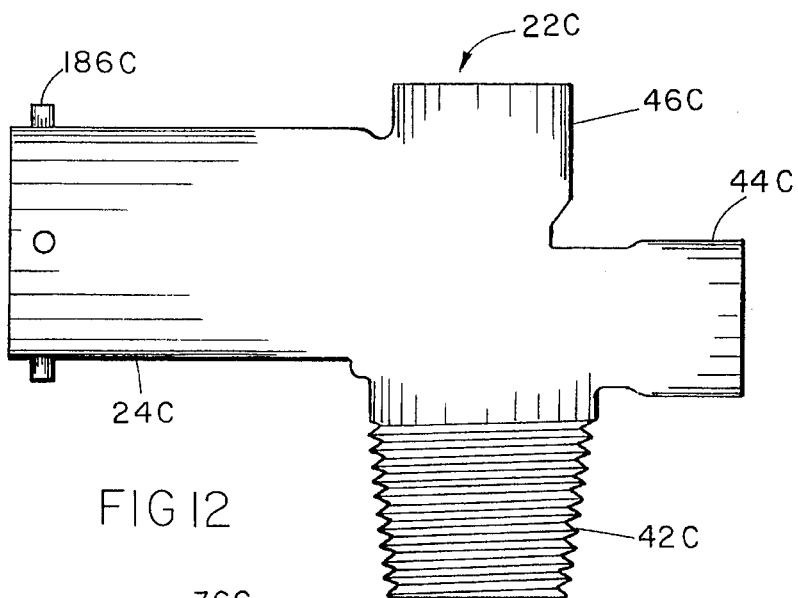
FIG. 12 is a simplified side elevational view showing a valve having a modified attachment structure for a modified form of thermal by responsive nut.
Figure 13:
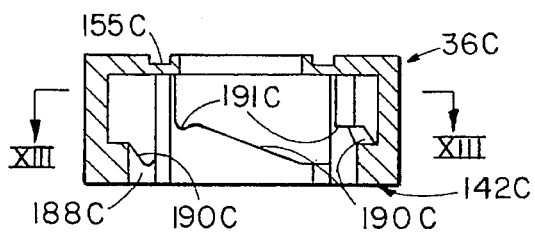
FIG. 13 is a side cross-sectional view of a thermally sensitive nut for use with the valve body of FIG. 12.
Figure 14:
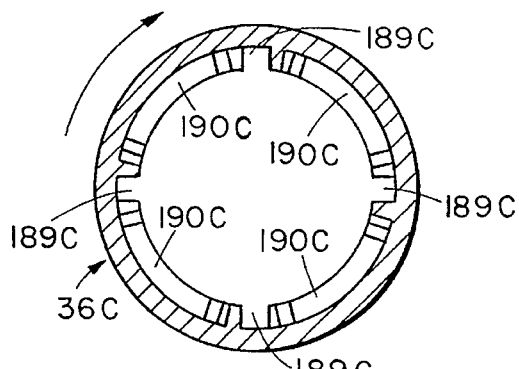
FIG. 14 is a cross-sectional view taken along the plane XIV—XIV in FIG. 13.
Figure 15:
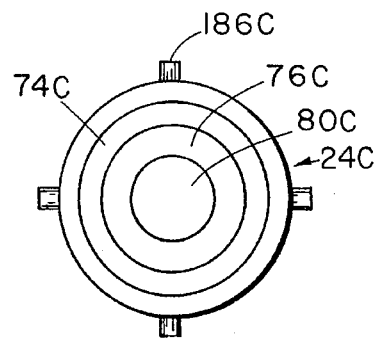
FIG. 15 is an end view of the valve outlet illustrated in FIG. 12.
Figure 16:
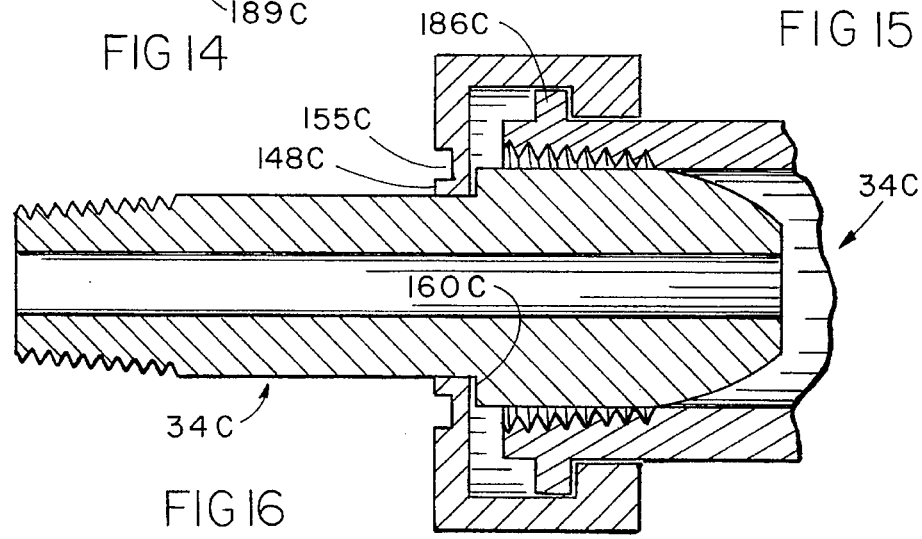
FIG. 16 is a side cross-sectional fragmentary view showing the interconnection of the thermally sensitive nut, probe and valve outlet as illustrated in FIGS. 12–15.

In FIG. 9, probe 34A is modified to indicate an enlarged bore 164A in center passage 156A at the configured end 154A. An excess flow controller 166A (FIG. 10) is press-fit into enlarged bore 164A. Excess flow controller 166A (U.S. Pat. No. 5,203,365) is preferably a commercially available part made by Mallard Products, Inc., 9155 Archibald Ave., Rancho Cucamonga, Calif. 91730. Excess flow controller 166A includes a plastic housing 168A with a bore 170A extending longitudinally therethrough. A seat 172A is defined in housing 168A and a magnet 174A is secured in a position spaced from seat 172A in housing 168A, with a magnetically sensitive disc 176A located therebetween. Magnet 174A magnetically holds disc 176A away from seat 172A until the gas flow in direction E exceeds a predetermined amount. At such time, the magnetic force holding disc 176A away from seat 172A and proximate to magnet 174A is overcome, and disc 176A is carried rearward and against seat 172A by the excess flow of gas through bore 156A of probe 34A. This substantially reduces and effectively terminates the overflow condition; however, a predetermined small amount of gas is preferably allowed to continue flowing whereby the pressure on both sides of disc 176A will become equalized in the absence of leaks. If this occurs, disc 176A will be drawn off seat 172A by magnet 174A, and normal flow can then be reestablished.

Figure 11:
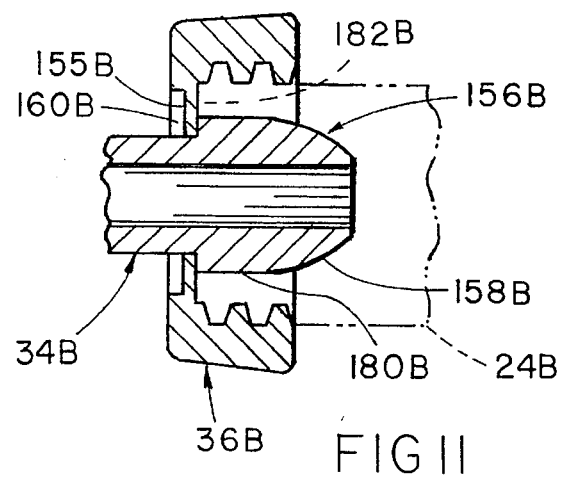
FIG. 11 is a fragmentary sectional elevation showing a modification of the probe and thermally sensitive nut embodying the present invention.

Probe 34B (FIG. 11) is a modified probe for use with a modified nut 36B. Probe 34B includes a modified configured end 156B. In the configured end 156B, tapered surface 158B extends rearwardly and joins a cylindrically shaped portion 180B such that the rear shoulder 160B is positioned at or outwardly of the terminal end 182B of the valve outlet 24B. Nut 36B is modified to eliminate the projecting cylindrical inner section (i.e., section 148 of FIG. 3). The thermally sensitive nut member 155B thus directly engages shoulder 160B, and probe 34B is thus self-centering in valve outlet 24B.

FIGS. 12–16 show another modification wherein nut a (FIG. 13) is used which is modified to engage external posts 186C (FIGS. 12, 15 and 16) on the outside of valve outlet 24C, in a bayonet-type attachment. Two or more such spaced posts 186C (FIG. 13) are provided on the outside of valve outlet 24C and the external threads (70), used on the nut of the previous embodiments are eliminated. Nut 36C is modified so that its outer section 142C includes a series of spaced internal channels 188C having inlet portions 189C leading into inclined portions 190C. Each channel 188C is shaped to receive one of the posts 186C. By rotating nut 36C about 90 degrees, posts 186C rampingly engage inclined channel portions 190C to bias nut 36C onto valve outlet 24C. Upon full engagement, posts 186C seat in offset depressions 191C at the ends of inclined surfaces 190C. Nut thermally sensitive portion 155C and nut inner section 148C (FIG. 16) thus engage probe ledge 160C to force probe 34C into operative engagement with the activator (not shown in FIGS. 13–16 as in the previous embodiments).

Another modification is shown in FIG. 17 and generally referred to as connection system 20D. In connection system 20D, valve housing 40D and probe 34D are comparable to housing 40 (except for post 186D) and probe 34. However, module 32D (shown separately in its assembled state in FIG. 19) is modified to eliminate the module housing as follows. Module 32D includes an activator 200D that cannot be repaired or removed except with great difficulty. Activator 200D includes a cylindrically-shaped middle section 202D, a spring-engaging end 204D, and a sealing end 206D. Spring-engaging end 204D includes an outwardly extending radial end flange 208D at one end of reduced-diameter middle portion 202D, and a washer 212D and 0-ring retainer 214D are positioned around middle section 202D inwardly of end flange 208D to extend radially between middle section 202D and valve outlet bore 74D (FIG. 17). An 0-ring 216D is positioned in an annular groove extending around the inside diameter of 0-ring retainer 214D, to sealingly engage the latter while also permitting relative sliding movement.

Spring-engaging end 204D (FIG. 19) includes a protruding dome-like center portion 218D that extends axially toward second valve outlet bore 76D. A spiral-shaped coil spring 220D extends between seat 79D and actual or end flange 208D, with the end 224D of spring 220D being centered on and located around the protruding portion 218D. Sealing end 206D of activator 200D includes an outwardly extending radial flange 228D connected to the end of middle section 202D opposite spring-engaging end 204D, and a cylindrically-shaped second flange 230D extends axially from radial flange 228D. Cylindrical flange 230D is adapted to guide actuator 200D as it moves in bore 74D. A seal 232D is insert-molded onto flanges 228D and 230D, and retained thereupon by an inwardly oriented lip 236D on the open end of flange 230D. A washer 234D is positioned adjacent the inside of flange 228D to prevent flange 228D frown striking snap ring 84D as activator 32D is moved to the full open position. Washer 234D, retainer 214D and washer 212D can all be diametrically expandable for installation onto the body of activator 32D, or can be positioned on activator 32D before flange 208D is attached to activator 32D where this member is not of one-piece construction.

Snap ring 84D (FIG. 17) is located in an inaccessible position between activator flange 228D and 0-ring retainer 214D. The assembly can be made by compressing snap ring 84D and sliding activator 200D into bore 74D. However, once installed, snap ring 84D locks into a receiving groove (not specifically identified) and cannot be accessed for removal, thus providing a tamper-proof assembly. As thus assembled, snap ring 84D limits the travel of activator 200D by engaging 0-ring retainer 214D when activator 200D is in the closed position, and by engaging activator flange 228D when activator 200D is in the open position.

The operation of connection system 20D (FIG. 17) is comparable to that of the connection systems 20 shown in FIGS. 1–3. Specifically, probe 34D engages seal 232D as the probe progressively enters outlet 24D and then biases activator 200D to the open position. In this position, spring 220D is compressed and holes 128D are opened (i.e., uncovered). Thus, gas is allowed to flow through activator 200D. However, when the thermally sensitive nut (not specifically shown in FIG. 17) yields in response to the predetermined level of ambient heat, probe 34D releases and is moved away by spring 220D, which also biases activator 200D to a closed position.

A modification of activator 200D is shown in FIG. 18 and labeled generally as 240E. Activator 240E is generally comparable to activator 200D and includes a sealing end 206E, but has an outwardly extending flange 228E which does not include any holes for receiving material during an insert molding process for forming seal 242E. Rather, seal 242E is resiliently pressed into or insert molded in place upon the open end of the activator 240E. A radially inwardly oriented lip 244E on longitudinally extending flange 230E retains seal 242E in place. Activator 240E also includes a modified end 246E adapted to receive a cup-shaped seal 134E shaped comparably to seal 134. A protrusion 248E is located on the cup-shaped seal 134E for engaging central hole in modified end 246E to retain seal 134E on activator 240E. The operation of activator 240E is the same as activator 200D.

A system incorporating a modified regulator 26F is shown in FIG. 20. Regulator 26F includes a connector member 254F having an externally threaded portion 256F that replaces nut 36 of the previously-described embodiments. Member 254F includes an axial inner passage that operably receives probe 34F. Probe 34F includes a threaded end 152F which extends through and beyond member 254F, for engaging regulator 26F, and further includes a configured end 154F for engaging a module 32F (not specifically shown) in the outlet 24F of valve 22F in the general manner described in the prior embodiments. Externally threaded portion 256F includes a threaded end for engaging internal threads 72F in outlet 24F. Member 254F also includes an outwardly accessible handle or nut portion, etc. 258F by which an operator, may tighten member 254F into engagement with outlet 24F of valve 22F, thereby urging probe end 154F into operative engagement with the aforementioned module 32F inside outlet 24F.

Notably, various devices can be attached to valve 22 in place of regulator 26 or 26F, such as toggle valve 270G (FIG. 21), which is adapted for quick back-filling of gas through valve 22G. Toggle valves 270G are generally known in the art. In the illustrated embodiment, a connector member 254G having a probe 34G are engaged with toggle valve 270G for operable connection to valve 22G.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the present invention in which an exclusive property or privilege is claimed are defined as follows:

1. A valve insert module assembly for controlling gas flow from a source of gas to a gas-utilizing device in a system wherein the source includes a container adapted to hold gas under pressure and a gas-utilizing device coupled in flow communication with said container, comprising:

a valve and valve activator coupled together for movement of the valve by the activator, an activator housing for slidably receiving said activator, said activator housing defining a bore and including a seat for sealing engagement with said valve, said activator, valve and activator housing together comprising a modular valve insert assembly;

a first connector member having an outlet opening and a passageway for communicating pressurized gas from said container outward through said outlet opening, and a second connector member adapted to be coupled in flow communication with said gas-utilizing device and adapted to engage the first connector member;

said insert module assembly having a size and shape to be insertable through said first connector member outlet opening and fit mateably inside said passageway;

means for holding said activator housing in said passageway of said first connector member;

means for slidably mounting said activator in sealed relation in said bore of said activator housing with said valve sealingly engaging said seat when in a closed position to prevent the flow of gas through said bore, said insert module assembly further including a connector-engaging seal disposed to sealingly engage said second connector member when said first and second connector members are mutually interconnected; and resilient biasing means for urging said valve toward its closed position and urging said activator and connector-engaging seal toward said second connector member, said activator, connector-engaging seal, resilient biasing means and valve arranged such that as said first and second connector members are interconnected said connector-engaging seal engages and seals against the second connector member prior to and during movement of said activator and valve away from said closed valve position and toward said open position against the urging of said resilient biasing means, whereby loss of gas is substantially eliminated during both interconnection and disconnection of the first and second connectors and during all times when said valve is open.

2. An insert module assembly as defined in claim 1, wherein at least a portion of said activator comprises a piston and at least a portion of said activator housing forms a tubular sleeve for receiving the piston.

3. An insert module assembly as defined in claim 2, wherein said means for slidably mounting said activator in sealed relation in said bore of said housing includes a seal disposed operatively between said piston and said tubular sleeve.

4. An insert module assembly as defined in claim 3, wherein said seal disposed operatively between said piston and sleeve includes an o-ring portion encircling said piston.

5. An insert module assembly as defined in claim 4, wherein said connector-engaging seal comprises a molded resilient member carried by said activator and disposed in a position to make contact with said second connector member upon engagement of said first and second connector members.

6. An insert module assembly as defined in claim 5, wherein said molded resilient member is specially configured and non-symmetrical in an axial direction extending from the location where it is first contacted by said second connector member and toward said piston-sleeve seal.

7. An insert module assembly as defined in claim 6, wherein said specially configured molded resilient member integrally includes said connector-engaging seal and at least portions of said seal disposed between said piston and sleeve.

8. An insert module assembly as defined in claim 1, wherein said seat for engaging said valve is disposed generally at an end portion of said activator housing bore.

9. An insert module assembly as defined in claim 8, wherein said seat includes an annular structure generally encircling portions of said activator.

10. An insert module assembly as defined in claim 9, wherein said activator extends through said bore and said seat and said valve includes an annular portion disposed in alignment with said seat to move toward and into contact with it upon corresponding movement of said activator.

11. An insert module assembly as defined in claim 10, including a resilient disk-like seal disposed between said annular structure of said seat and said annular portion of said valve for contact by each to effect a seal therebetween.

12. An insert module assembly as defined in claim 10, wherein said activator comprises an elongated member having a longitudinal axis and a first end extremity disposed generally adjacent said seat in the closed position of said valve and said valve is attached to said first end extremity.

13. An insert module assembly as defined in claim 12, wherein said activator includes an elongated open internal passage extending longitudinally thereof and communicating with said first end extremity.

14. An insert module assembly as defined in claim 13, wherein said activator includes tubular wall portions defining said internal passage at least in part, and said wall portions includes openings extending therethrough generally adjacent said first end extremity, said openings being located so as to move beyond said seat when said activator moves said valve to its open position.

15. An insert module assembly as defined in claim 1, wherein said activator comprises an elongated member having a longitudinal axis and a first end extremity disposed generally adjacent said seat in the closed position of said valve and said valve is attached to said first end extremity, wherein said activator has a second end extremity spaced axially from and disposed generally opposite said first end extremity, and wherein said connector-engaging seal comprises a molded resilient member carried by said activator at said second end and disposed in a position to make contact with said second connector member upon engagement thereof with said first connector member.

16. An insert module assembly as defined in claim 15, wherein said molded resilient member is specially configured and non-symmetrical in a direction extending along said axis and from the location where said member is first contacted by said second connector member, said resilient member including an annular surface extending obliquely toward said axis for engaging said second connector member.

17. An insert module assembly as defined in claim 15, wherein said activator includes an elongated open internal passage extending longitudinally thereof and communicating between said first and second end extremities, said passage opening outwardly through at least said second end extremity, said molded resilient member being annularly shaped and extending generally around said passage opening at said second end extremity.

18. An insert module assembly as defined in claim 17, wherein said activator include tubular wall portions defining said internal passage at least in part, and said wall portions includes openings extending therethrough generally adjacent said first end extremity, said openings being located so as to move beyond said seat when said activator moves said valve to its open position.

\* \* \* \* \*